United States Patent [19]

Boulton

[11] Patent Number: 4,985,697
[45] Date of Patent: Jan. 15, 1991

[54] ELECTRONIC BOOK EDUCATIONAL PUBLISHING METHOD USING BURIED REFERENCE MATERIALS AND ALTERNATE LEARNING LEVELS

[75] Inventor: David A. Boulton, Santa Clara, Calif.

[73] Assignee: Learning Insights, Ltd., San Jose, Calif.

[21] Appl. No.: 146,933

[22] Filed: Jan. 21, 1988

Related U.S. Application Data

[63] Continuation-in-part of Ser. No. 69,667, Jul. 6, 1987, abandoned, and Ser. No. 58,093, Jun. 4, 1987, abandoned, which is a continuation-in-part of Ser. No. 821,580, Jan. 21, 1986, abandoned.

[51] Int. Cl.⁵ .............................................. G09G 1/02
[52] U.S. Cl. ................................. 340/750; 340/799; 340/798
[58] Field of Search ............... 340/700, 706, 711, 798, 340/799, 815.01, 825.19, 750; 360/40, 29; 364/709, 710; 434/307, 317, 318, 323, 321, 365

[56] References Cited

U.S. PATENT DOCUMENTS

| | | |
|---|---|---|
| 3,218,618 | 11/1965 | Warren . |
| 3,405,232 | 10/1968 | Morrow et al. ............... 364/29 |
| 3,573,766 | 4/1971 | Perkins, Jr. . |
| 3,821,716 | 6/1974 | Ghajar ............................ 360/40 |
| 3,889,292 | 6/1975 | Bocek . |
| 3,938,139 | 2/1976 | Day ................................ 340/798 |
| 3,987,484 | 10/1976 | Bosche et al. . |
| 3,996,671 | 12/1976 | Foster ............................ 434/307 |
| 3,999,307 | 12/1976 | Tsuda et al. .................. 434/307 |
| 4,060,848 | 11/1977 | Hyatt . |
| 4,159,417 | 6/1979 | Rubincam ................ 340/815.01 |
| 4,160,242 | 7/1979 | Fowler et al. ................ 340/799 |
| 4,406,626 | 9/1983 | Anderson et al. ........... 434/307 |
| 4,509,139 | 4/1985 | Creager, Sr. ................. 364/900 |
| 4,519,008 | 5/1985 | Takenouchi et al. .......... 360/79 |
| 4,649,380 | 3/1987 | Penna . |
| 4,689,022 | 8/1987 | Peers et al. . |
| 4,703,573 | 11/1987 | Montgomery et al. ....... 434/317 |

FOREIGN PATENT DOCUMENTS 110427A 6/1984 European Pat. Off. .

Primary Examiner—Jeffery A. Brier
Attorney, Agent, or Firm—Townsend and Townsend

[57] ABSTRACT

A method for compiling and presenting educational material on an electronic book is disclosed. A set of information requiring a first level of comprehension is created at a terminal or provided from a pre-existing data base. The set of information is examined for words which require a higher level of comprehension. Different types of explanatory information are created for such words and are tagged to the words so that they can be immediately called up when the word is later presented. The compiled first set of information at a first level of comprehension is a first modality. Additional modalities at different levels of comprehension or simply adjusted for different learning styles are also prepared. Each modality is cross-indexed to the other modality at a conceptual meaning level. The conceptual meaning level can be roughly a paragraph long block. The electronic book uses analog storage on a magnetic tape. A magnetic tape is a tape drive mechanism stores textual material of a book in the form of encoded analog signals. The tape reader provides an analog electrical signal which is fed to an analog-to-digital converter for conversion into a digital data stream. A digital buffer capable of storing an amount of data corresponding to at least several pages of text, but not the entire book, is provided. A display coupled to the digital buffer displays a page of textual data from said buffer at any one time. A controller responsive to user input signals advances the tape and replaces the data stored in the buffer with new data to advance through pages of the book. A speech synthesizer may be used in place of the display for visually impaired users.

12 Claims, 15 Drawing Sheets

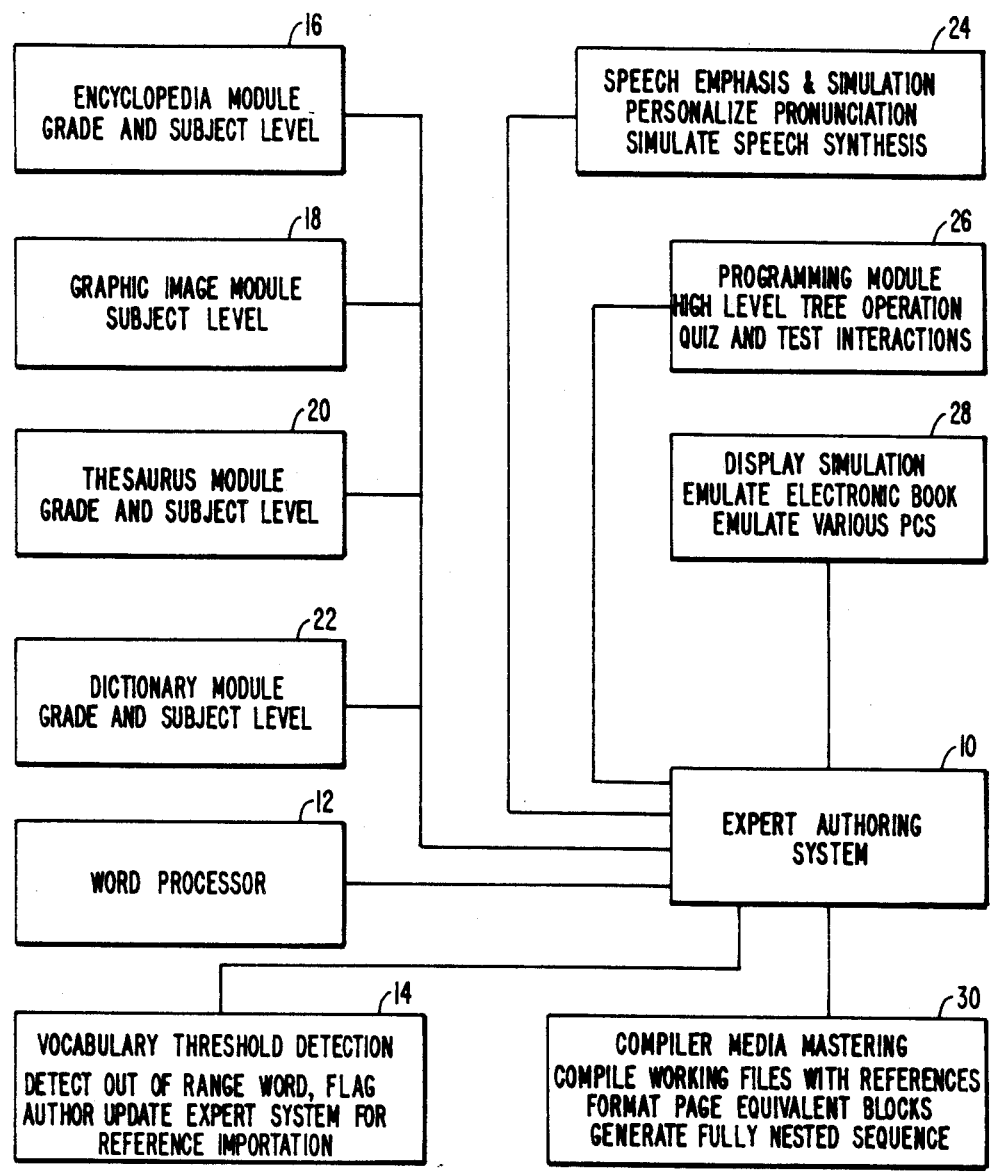
FIG._1.

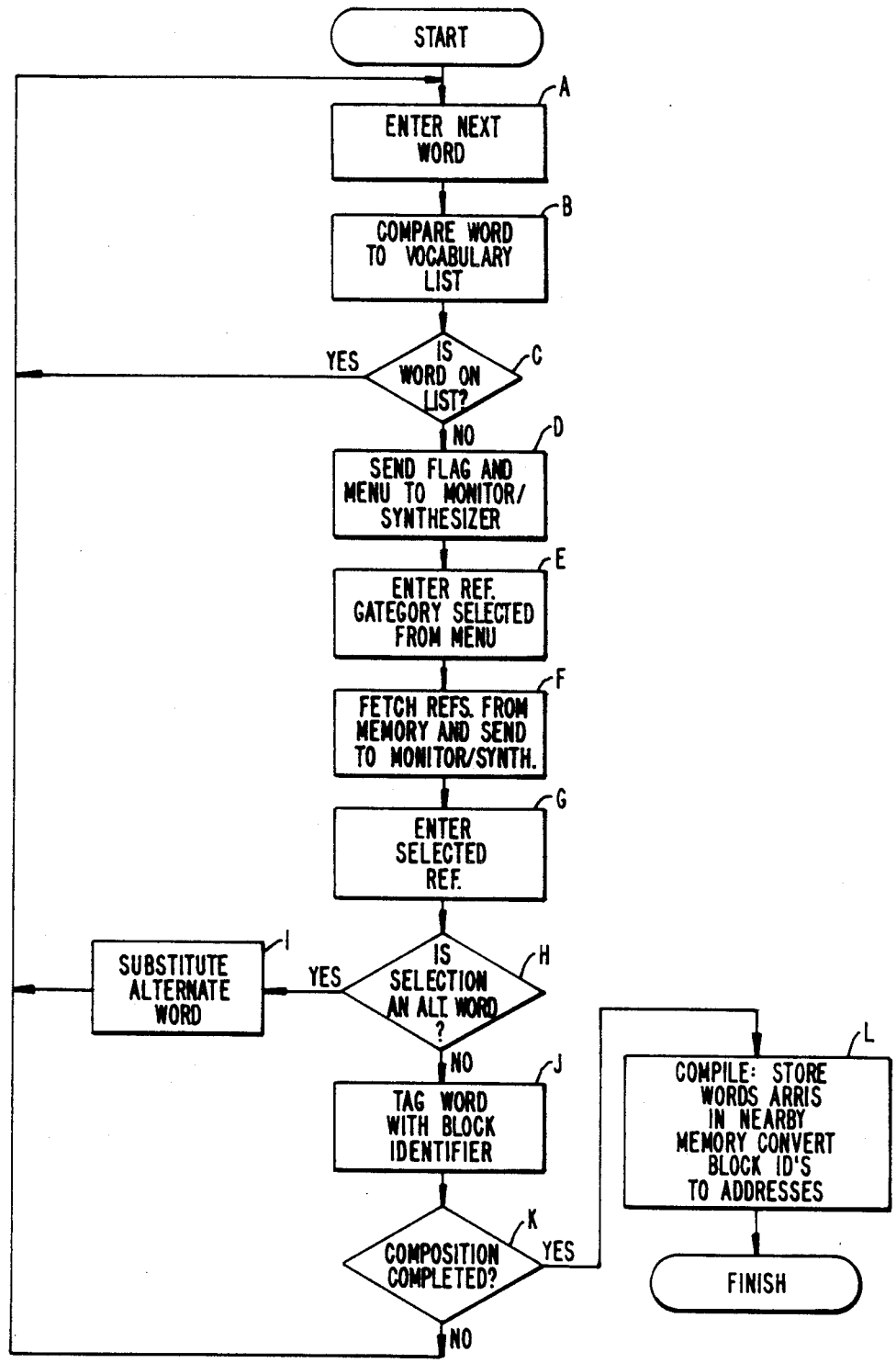
FIG._2A.

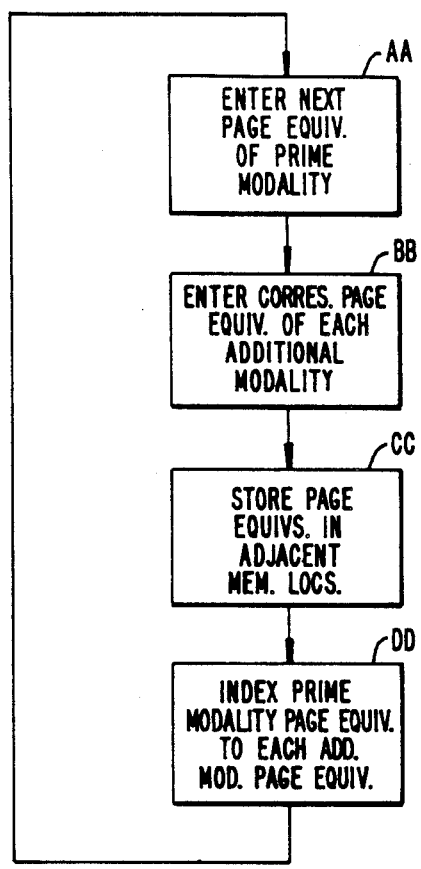
FIG._2B.

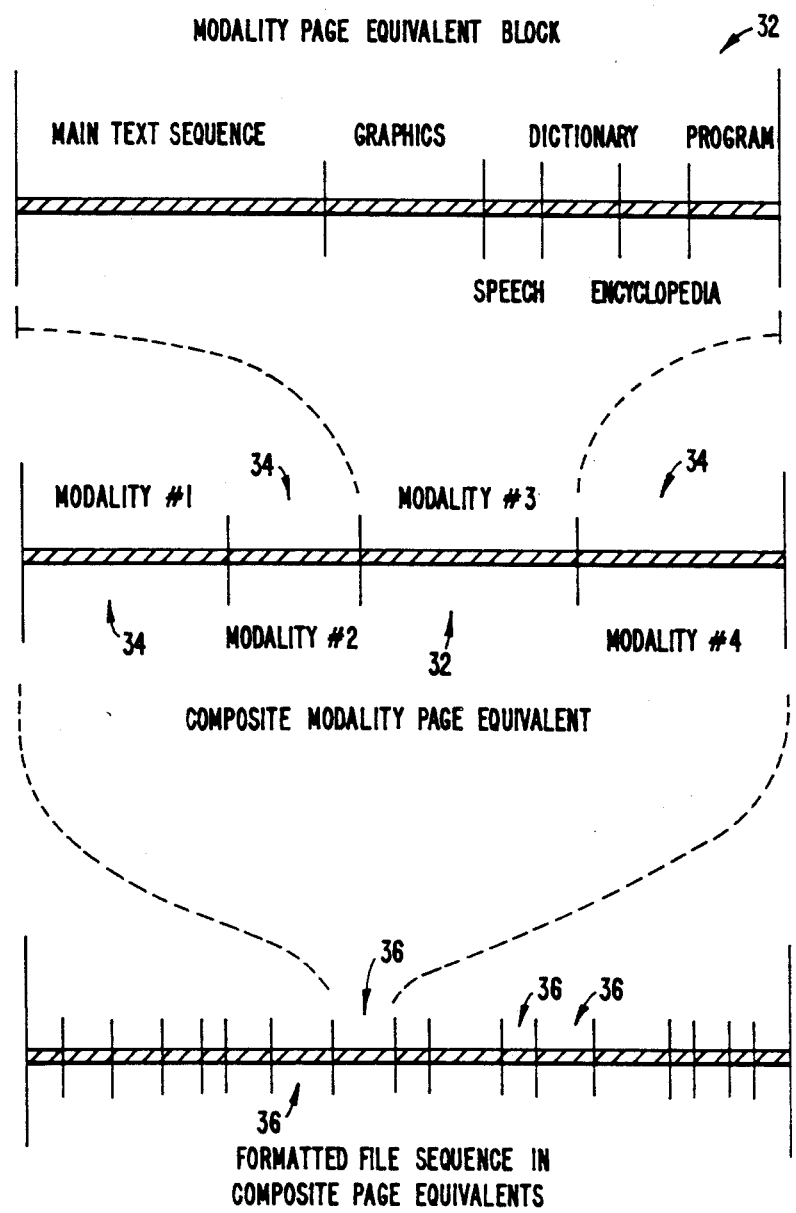
FIG._3.

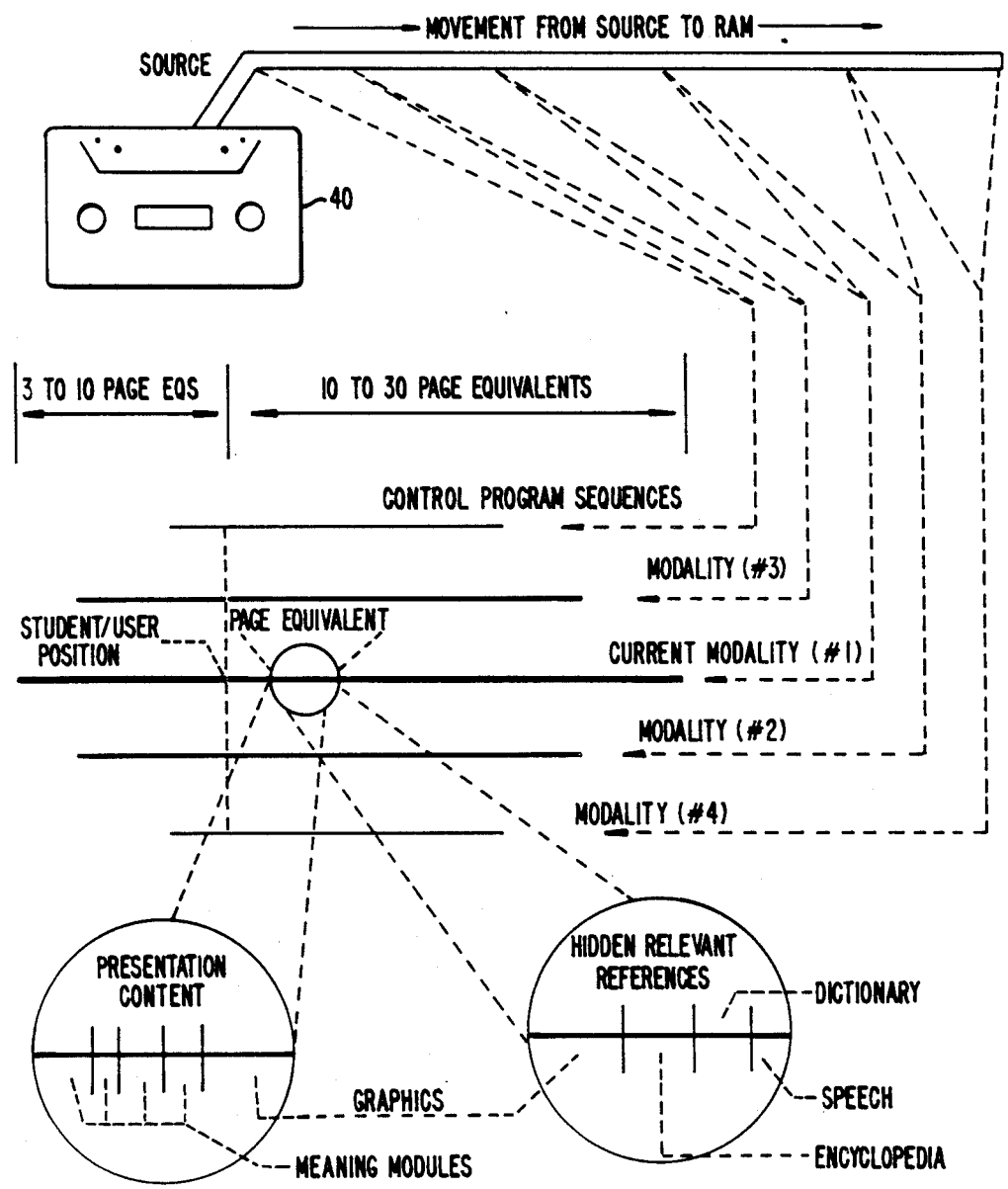
FIG._4.

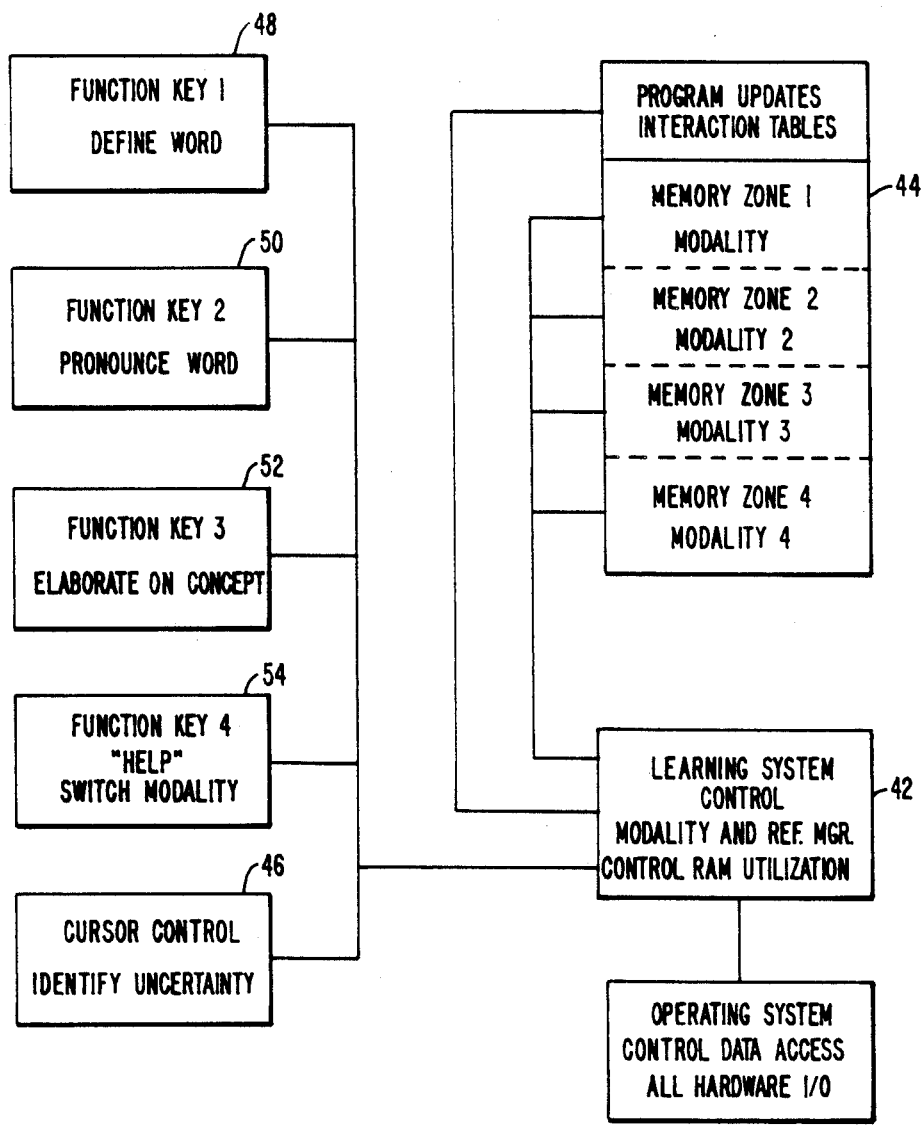
FIG._5.

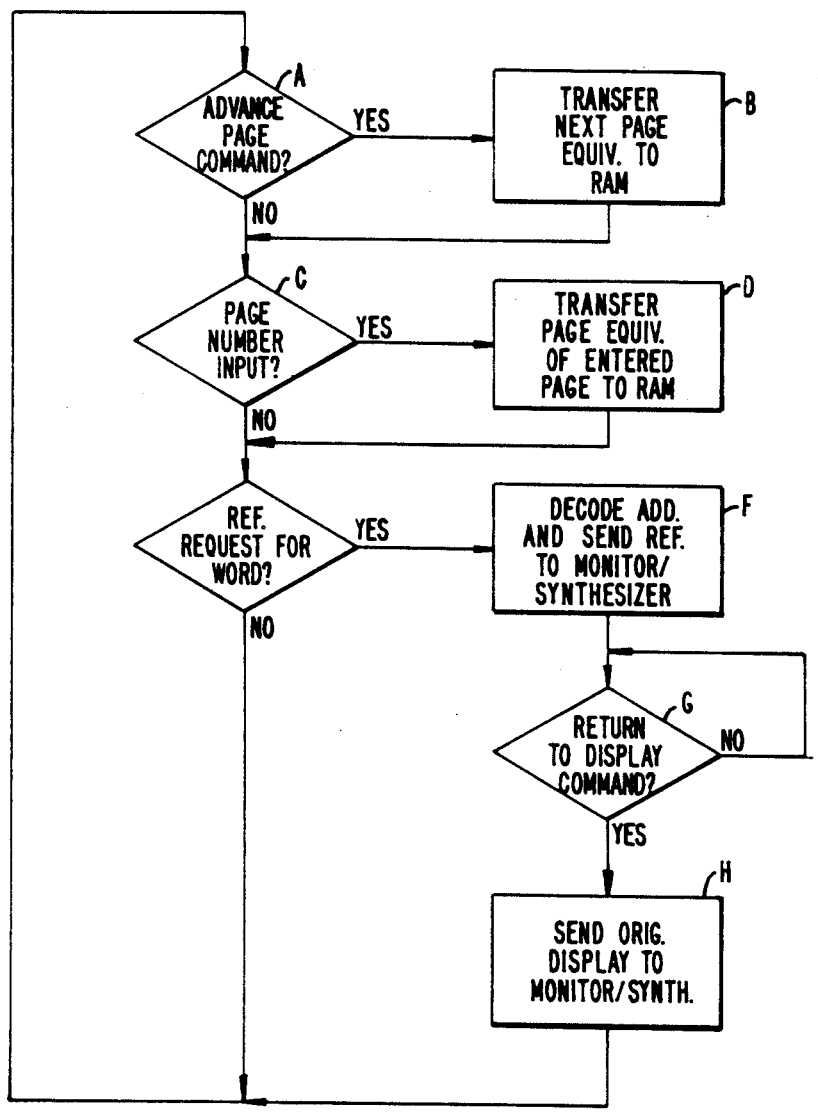
FIG._6.

ARBITRARY DIVISIONS OF CONTENT
```
     WORD      1
  SENTENCE     2
 PARAGRAPH     3
ASSIGNMENT     4
   CHAPTER     5
      BOOK     6
```
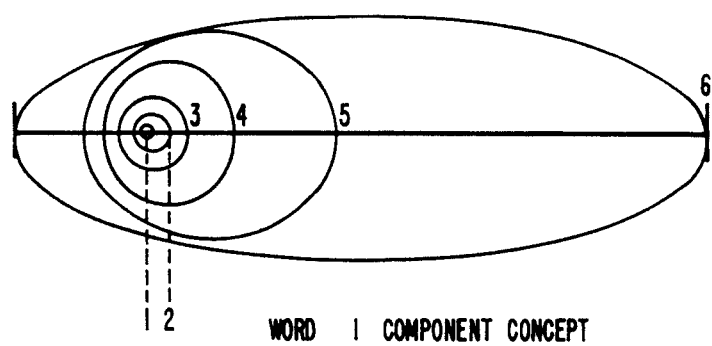
```
     WORD      1  COMPONENT CONCEPT
  SENTENCE     2  SUB CONCEPT
 PARAGRAPH     3  CONCEPT
ASSIGNMENT     4  SUB DOMAIN OF MEANING
   CHAPTER     5  DOMAIN OF MEANING
      BOOK     6  SCOPE OF MEANING
```
DISTINCTIONS BY MEANING PROVIDE INDEXING RELEVANCY
FIG._7.

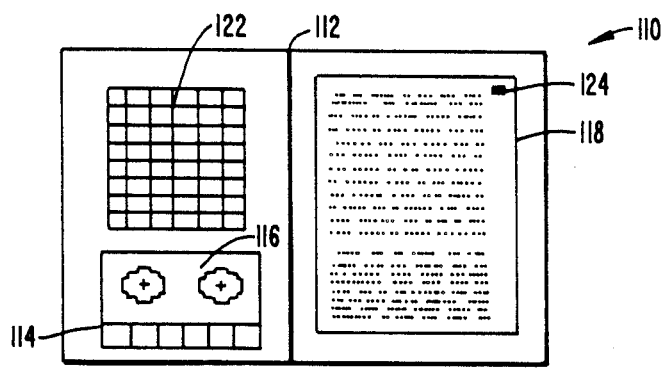
FIG._8.
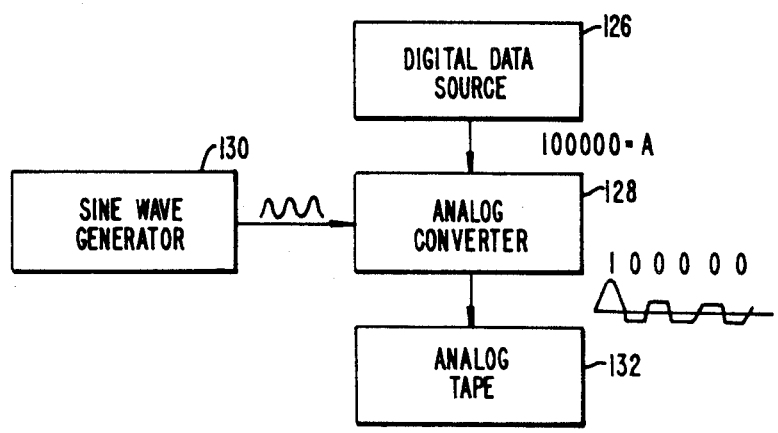
FIG._9.

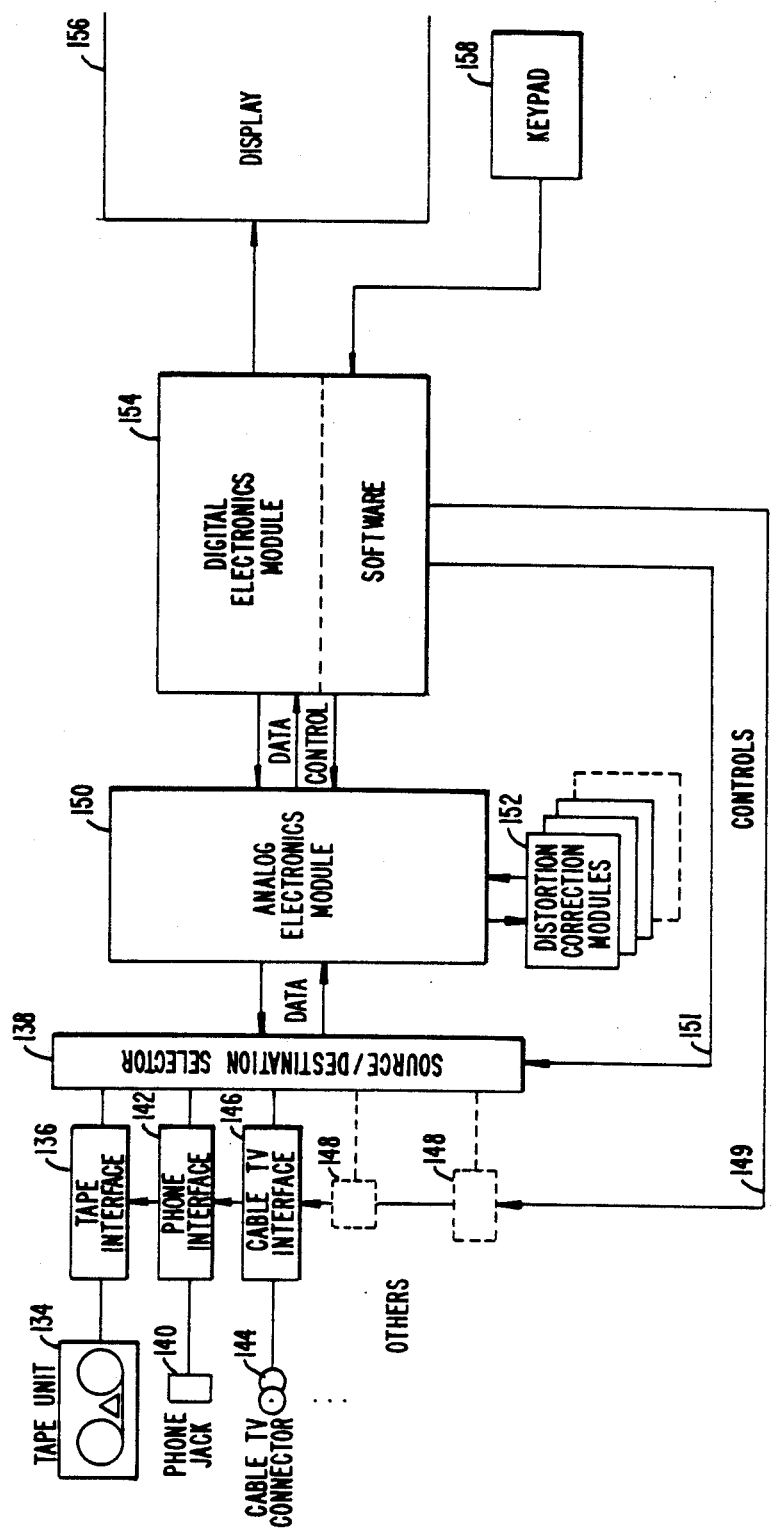

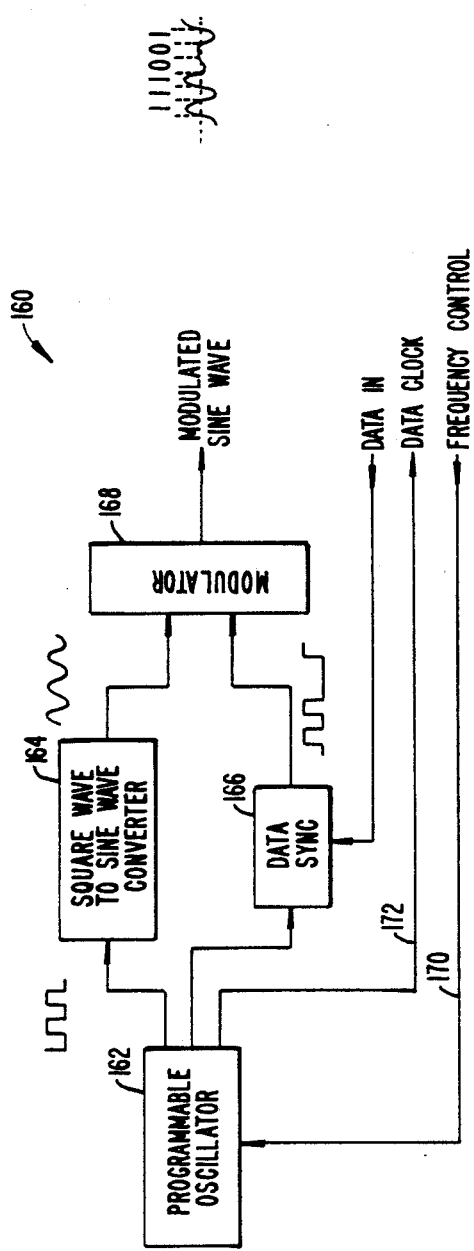
FIG.—11.
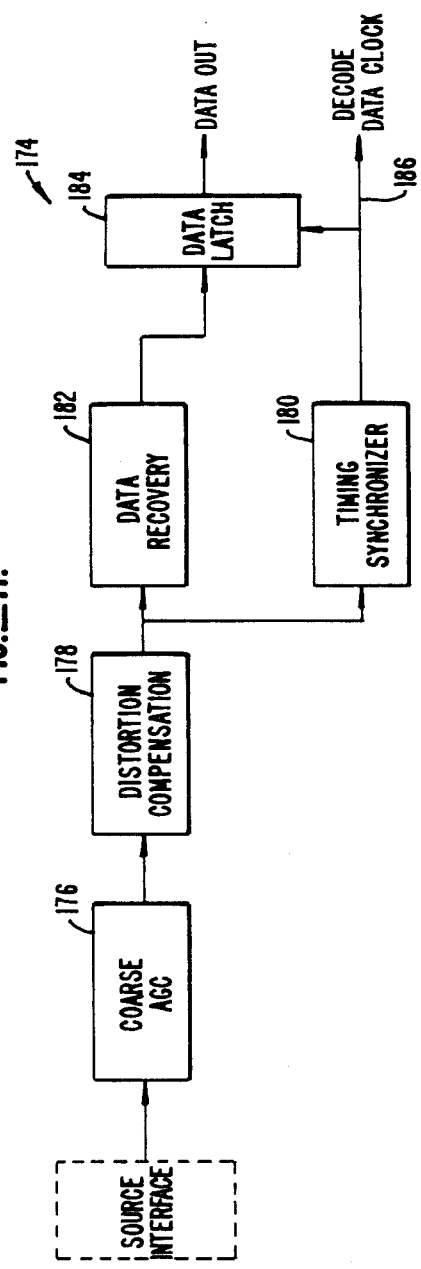
FIG.—12.

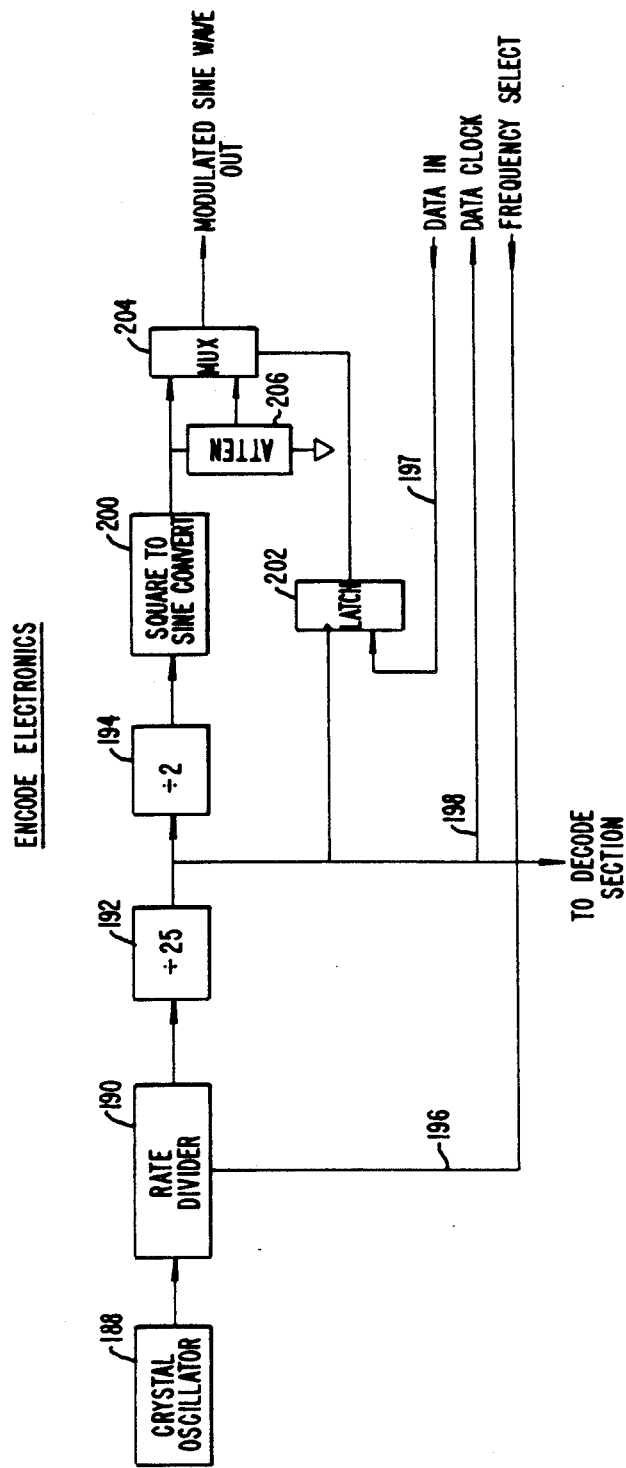
FIG._13.

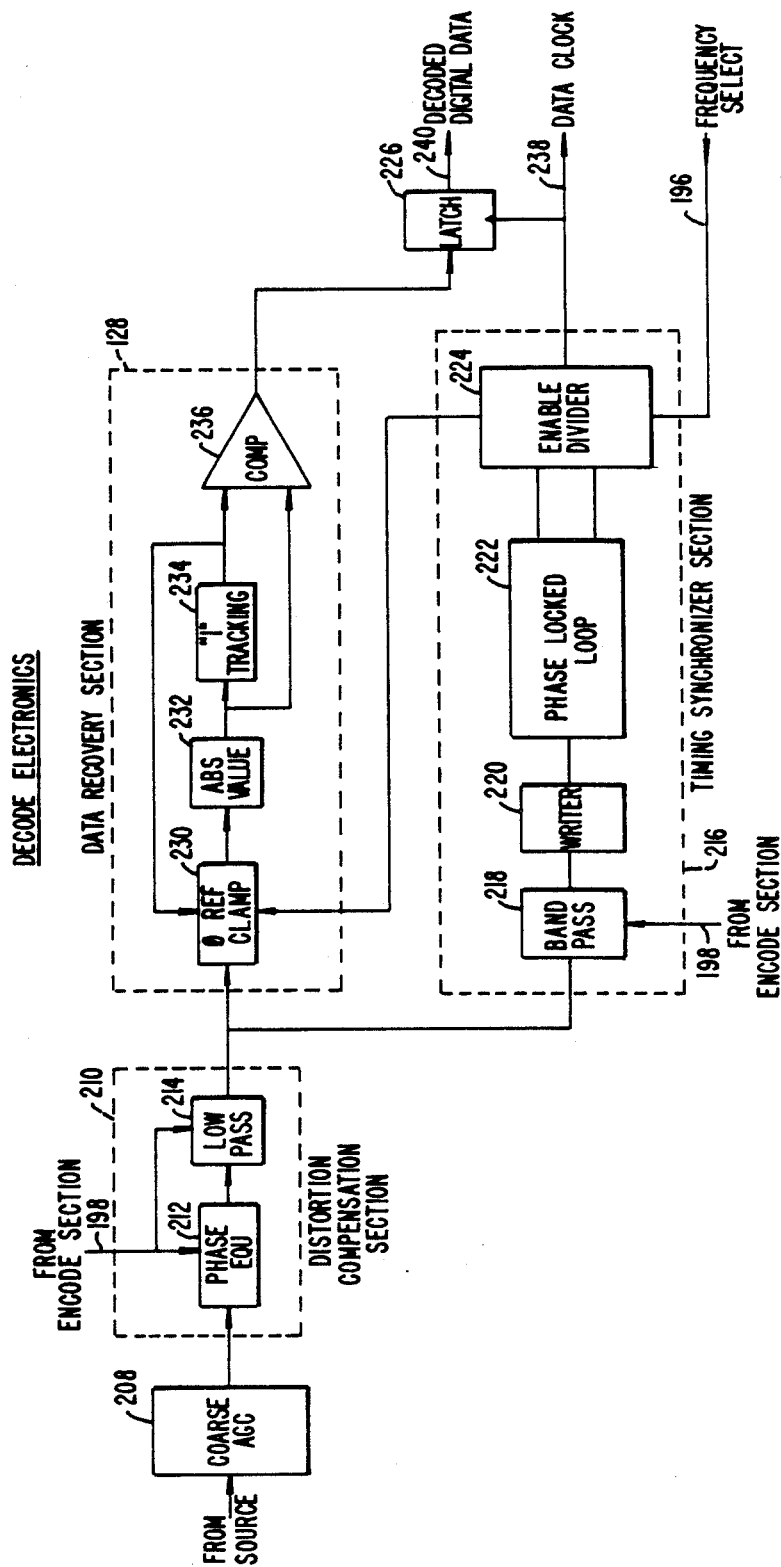
FIG._14.

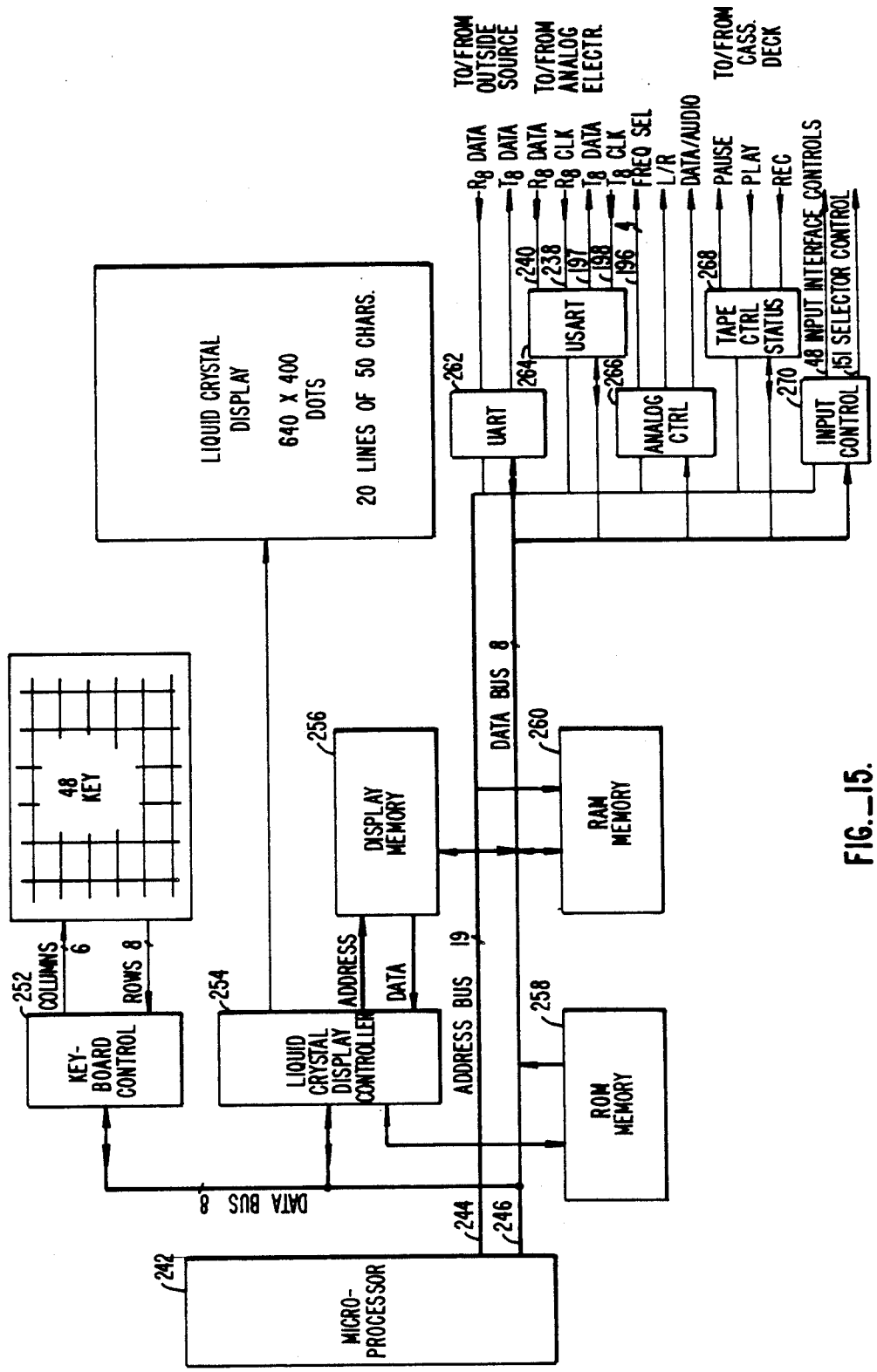
FIG._15.

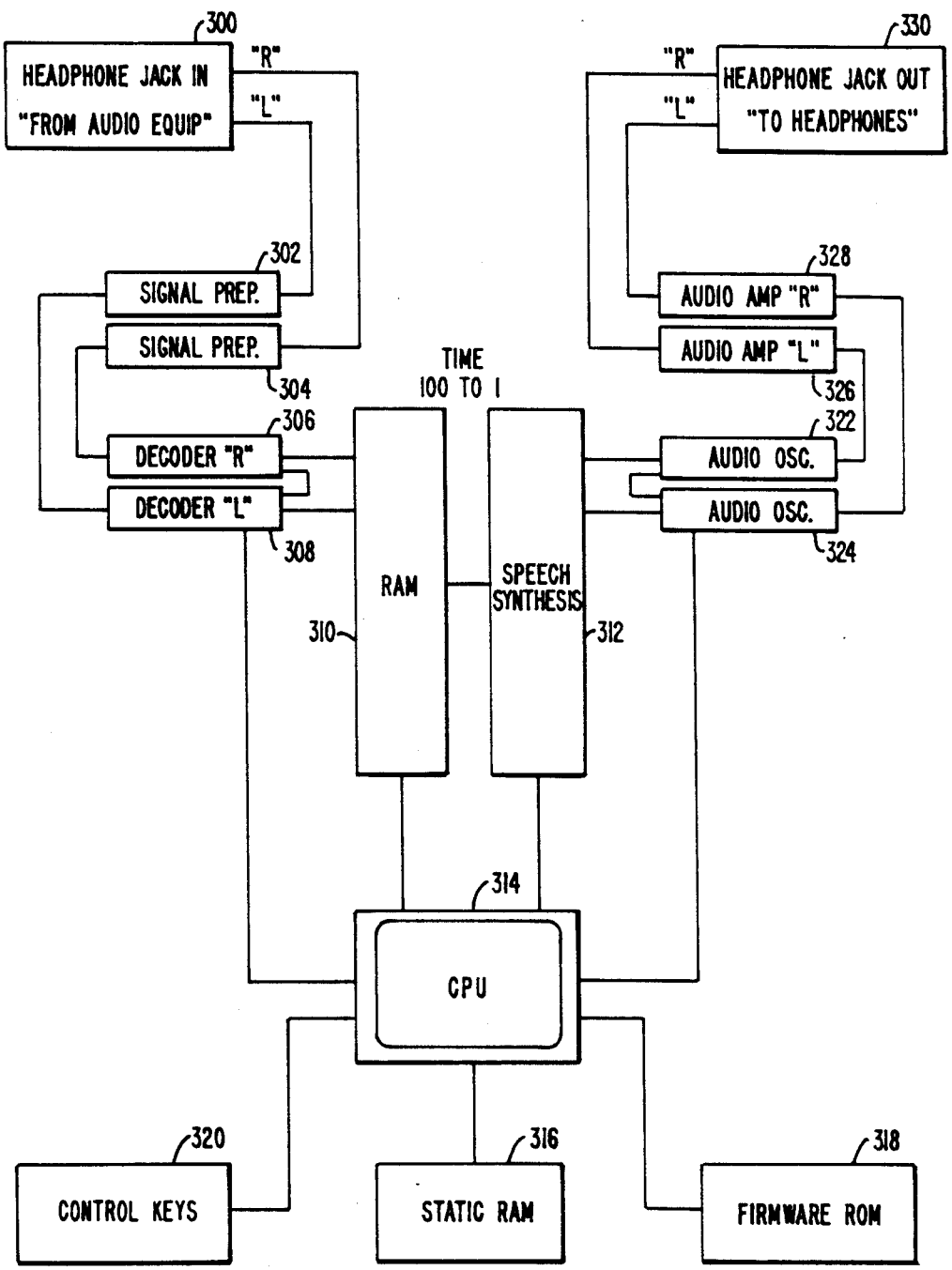
FIG._16.

ELECTRONIC BOOK EDUCATIONAL PUBLISHING METHOD USING BURIED REFERENCE MATERIALS AND ALTERNATE LEARNING LEVELS

This is a continuation-in-part of application Ser. No. 069,667, filed July 6, 1987 now abandoned, and application Ser. No. 058,093, filed June 4, 1987 now abandoned, as a continuation-in-part of application Ser. No. 821,580, filed Jan. 21, 1986 now abandoned.

BACKGROUND

The present invention relates to methods for compiling and presenting educational, reference and training materials.

Vocabulary, and more importantly, the meaning associated with words, differs widely among individual readers. An individual's vocabulary directly affects his ability to comprehend information presented to him.

The traditional approach to the authoring and publishing of educational, reference and training materials necessarily presumes a particular level of comprehension by the reader. This assumption becomes the basis for the author's selection of vocabulary. Recognizing the problems created by this assumption, authors often include a glossary to help insure that key words and phrases are understood.

When a glossary is insufficient, it is expected that the readers will seek outside references to clarify their understanding of the material. However, when a reader becomes lost by the author's choice of words or descriptions, the time and effort required to obtain other reference material often becomes a major obstacle to meaningful continuation. Students faced with this difficulty will often "jump" over blocks of text rather than spend the time to seek out alternate descriptions in an attempt to understand the author's meaning.

A growing body of experts have confirmed that each reader is unique in the way he learns. Vocabulary is only one of the factors which affects learning differences, other factors have been identified. Bundling variations in these factors into broad groups, a manageable number of separate learning styles have been identified and are becoming the basis for separate learning material presentations. The educational community calls these styles "learning modalities." Educational psychologists suggest that effective teaching of students in these different modality groups requires a different educational approach for each. These psychologists further suggest that any one rigid presentation (such as a book, lecture, etc.) will reach less than thirty-five percent of the students, some as little as sixteen percent. They recommend that ideally, at least four entirely different approaches to education be used, one for each major modality identified (see appendix).

Thus far, the computer software which has been written for education has largely ignored the concept of learning modalities and, as a result, have limited compatibility with learners.

Computers have not been a practical alternative for presenting textual information to a student. Early mainframe computers used reel-to-reel magnetic tapes to input and store data. Early personal computers used cassette tapes for the same purpose. These tapes were used to load data from an archive onto the computer, with the data then being stored in digital memory in the computer using core memory or, more recently, random access memory (RAM) on silicon chips. The signal stored on the magnetic tape was typically a series of positive going pulses, with the positive going pulse being interpreted as a digital one and the absence of a pulse being interpreted as a digital zero. In order to transmit a stored signal over telephone lines, a modem is required to modulate an analog carrier frequency with the digital pulses.

More recently, hard disks and floppy disks have been developed to magnetically store digital data on a disk-shaped device. A disk drive could very quickly access data on any portion of the disk, thereby overcoming a major drawback of magnetic tapes, which have a slow access time. A magnetic tape would have to be wound to the proper position for input of a particular bit of data. Unfortunately, disk drives are more expensive than tape drives.

Most recently, laser disks, or compact disks, have been developed in which data are stored as a series of holes burned into a metal or plastic substrate by a laser. Such disks can store a billion bits of information on a side. Laser readers, or compact disk players, have been devised for such disks and are currently used for home music systems. A record is stored as a series of digital bits on a disk which are converted back to an analog signal by the compact disk player. Interfaces are being developed to couple such a compact disk player to personal computers so that the computers could directly accept the digital information from a compact disk. This type of a system could be used to store books on compact disks and then display them on a personal computer. Efforts continue to reduce the costs of such mass digital storage devices to make them available to the average consumer. Presently, however, none of these digital storage devices are sufficiently economical to replace the hard copy printed book.

SUMMARY OF THE INVENTION

The present invention is a method and apparatus for compiling and presenting educational material on an electronic book. A set of information requiring a first level of comprehension is created at a terminal or provided from a pre-existing data base. The set of information is examined for words which require a higher level of comprehension. Different types of explanatory information are created for such words and are tagged to the words so that they can be immediately called up when the word is later presented.

The compiled first set of information at a first level of comprehension is a first modality. Additional modalities at different levels of comprehension or simply adjusted for different learning styles are also prepared. Each modality is cross-indexed to the other modality at a conceptual meaning level. The conceptual meaning level can be roughly a paragraph long block.

The different modalities with their tag references are stored on a magnetic tape with each conceptual meaning block of a modality logically adjacent the corresponding block for the other modalities, including their tagged references.

A learning system is used to present the information stored on the magnetic tape on an electronic book. One or a few page-equivalent portions of a first modality and the corresponding portions of the other modalities, all with their tagged references, are transferred to a high-speed random access memory (RAM). A user then sequentially advances through the information and new page equivalents are fetched from the permanent memory as the user reaches the end of the portion stored in RAM. The user can obtain the hidden references for a particular word by highlighting the word and pressing the appropriate key on a keyboard. Alternately, a user can switch to a different modality by pressing an appropriate control key.

The electronic book utilizes analog storage on a magnetic tape. A magnetic tape in a tape drive mechanism stores textual material of a book in the form of encoded analog signals. The tape reader provides an analog electrical signal which is fed to an analog-to-digital converter for conversion into a digital data stream. A digital buffer capable of storing an amount of data corresponding to at least several pages of text, but not the entire book, is provided. A display coupled to the digital buffer displays a page of textual data from said buffer at any one time. A controller responsive to user input signals advances the tape and replaces the data stored in the buffer with new data to advance through pages of the book.

The analog data encoded on the tape is in the form of a sine wave of preferably approximately 10-20 kilohertz (kHz). Each half-cycle of the sine wave is amplitude modulated to indicate either a digital zero or a digital one. Any type of information can be stored and displayed, whether it is text, graphics, pictorial or otherwise. By using an analog signal, rather than a series of positive pulses as in the prior art, the signals stored on the computer of the present invention can be transmitted over telephone lines directly without the use of a modem. The tape of the present invention can also be used directly as a storage device which is inserted into the book, rather than being used simply as an input device. This is possible due to the dedicated purpose of the present invention as an electronic book, rather than a multipurpose computer.

The magnetic tape of the present invention is preferably provided with a series of flags which are periodically placed on the tape to provide a position indicator. The flag is encoded on a separate track or by using a unique character, which, when detected, increments a counter in the controller. This counter provides a page reference signal which allows the controller to quickly determine when a desired page has been reached as indicated by the count in the counter. The position on the tape is thus used to determine a location in the text, eliminating the need to examine the data to determine location. The electronic book is provided with a keyboard for advancing and retreating pages as well as for specifying a particular page to be accessed.

The data is preferably organized in blocks, with a table of contents indicating the location of each block. There may be minor tables of contents to provide a further breakdown of the data. Each block may be designated by a flag or by a distance from a designated flag.

The digital buffer preferably has sufficient memory to store approximately 20 pages of text. As a reader advances through the pages, the last several pages in the buffer are automatically deleted and the next several pages are automatically added to the buffer so that a reader can always go forward or back a few pages without waiting for the tape mechanism to move. The delay caused by the tape mechanism is not a disadvantage for the electronic book since it is well within the normal reading speed of users.

The electronic book can be adapted for use by the blind, or for applications where a user does not want to view a screen, by substituting a voice synthesizer for the visual display. The index is verbally supplied to the user. Preferably, two tracks on the tape are used, one for the raw data and one for index and control data, with space for optional user responses or verbal notes.

A combination of visual and synthesized audio outputs are provided in another embodiment, with the user selecting the desired output mode.

The present invention thus provides a relevant random access learning system. Relevant Random Access is a term which describes a process whereby the reader has instantaneous access to contextually relevant reference materials. These materials can include a dictionary, a thesaurus, graphic images, an encyclopedia-like concept elaborator, programmable simulations and audible pronunciation. In addition to these reference materials, the reader has access to several different versions of the basic text. Each of these versions is written to match a different learning modality, and contains it's own context controlled references.

Essentially, the Relevant Random Access system of the present invention is designed to provide the user with an opportunity to more fully comprehend the intended material through the employment of alternative (modality) descriptions which each present a given subject in a way "tuned" to the learning style of the individual. Each such modality specific description contains it's own contextually relevant reference material. The system utilizes quizzes or prompts to ascertain the modality best suited to the reader, then proceeds to present that modality.

When words or concepts are not fully understood, the user need only highlight the word, sentence or paragraph, press the appropriate function key (which corresponds to the nature of uncertainty), and he is presented with a contextually relevant reference. At locations in the text chosen by the author, the reader is presented with quizzes to determine if switching to a different modality would further optimize the learning process.

One embodiment of the system of the present invention is comprised of two major sub-systems which each contain a number of modules. The first is the Authoring System which is an expert system that enables the author to simply and easily correlate grade level, learning modalities, and relevant references to his or her word processing activities. The second is the Learning System, which is run by the Electronic Book. The Learning System provides the student/reader with ease of access to the reference materials included by the author.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of one embodiment of a compiling system according to the present invention;

FIG. 2A is a flowchart illustrating one method of compiling relevant references;

FIG. 2B is a flowchart of one method of compiling different modalities;

FIG. 3 is a diagram showing formatting of memory with different modalities and corresponding references;

FIG. 4 is a diagram showing the movement of a page equivalent of a modality along with the additional modalities and hidden references from permanent memory to RAM;

FIG. 5 is a diagram of the operation of one embodiment of a learning system;

FIG. 6 is a flowchart showing the operation of a learning system as in FIG. 5;

FIG. 7 is a diagram illustrating the partitioning of a modality into meaning blocks;

FIG. 8 is a front elevation view of preferred embodiment of an electronic book according to the present invention;

FIG. 9 is a schematic diagram of one embodiment of the analog signal encoding according to the present invention;

FIG. 10 is a functional block diagram of the circuitry of the electronic book of FIG. 8;

FIG. 11 is a general block diagram of the encode electronics section of the analog electronics module of FIG. 10;

FIG. 12 is a general block diagram of the decode electronics section of the analog electronics module of FIG. 10;

FIG. 13 is a detailed block diagram of the circuit of FIG. 11;

FIG. 14 is a detailed block diagram of the circuit of FIG. 12;

FIG. 15 is a block diagram of the digital electronics module of FIG. 10; and

FIG. 16 is a block diagram of an electronic book with a speech synthesizer.

DETAILED DESCRIPTION OF THE PREFERRED EMBODIMENTS

FIG. 1 shows a block diagram of a software system according to the present invention for compiling information. An expert authoring system 10 coordinates the various functions of the compiling system. The information is compiled on a word processor 12, or, alternately, is provided from a pre-existing file. A vocabulary threshold detection module 14 monitors the words generated by word processor 12 and provides a flag to authoring system 10 if a word is out of the selected comprehension range. The author can then change the word or provide a hidden reference from an encyclopedia module 16, a graphic image module 18, a thesaurus module 20 or a dictionary module 22.

The system is also provided with a speech synthesis module 24, a programming module 26 and a display simulation module 28. Speech synthesis module 24 gives the capability to store the synthesized pronunciation of the word with that word to allow later access by a student. The pronunciation can be personalized and changed by the author as desired. Programming module 26 allows the author to insert such things as quizzes and other interactive processes to determine whether a student is comprehending the material. Depending upon the answers given in the quiz, the author may specify a switch to another modality stream, presentation of additional reference material, or automatic backtracking in the presentation. Display simulation 28 allows an author to view how the presentation will look on a monitor when later viewed by a student. The author can then format the presentation as desired to give any desired effects.

Expert authoring system 10 encloses a DOS shell and sets up the hardware's random access memory space to rapidly manipulate the following modules stored in memory: the operating system; expert authoring system 10; word processor 12; vocabulary threshold detection 14; working file space; and imported reference space for modules 16–22.

Expert authoring system 10 is a reference and integration tool. Often transparent to the author, the system is activated by vocabulary threshold detection module 14.

Vocabulary threshold module 14 is originally created in conjunction with the reference modules for a particular level of comprehension. The operation is shown in the flowchart of FIG. 2A. The system operates similarly to a spell checker which can read files or monitor keyboard inputs for "on-the-fly" errors. As each word is entered (step A), that word is compared to a vocabulary list (step B). This list of words contains words which are conservatively considered to be safe for the pertinent level of comprehension. If the word is on the list, the process continues for the next word (step C). Otherwise, a flag signal is sent to the monitor (or voice synthesizer) to indicate to the author that the word is outside the boundaries of comprehension (step D). A menu of reference options is presented to the author and the option selected by the author is noted (step E). The relevant references for that reference category are then fetched and displayed (step F). For instance, if a dictionary reference is chosen, several different dictionary definitions may be presented. The author then selects the desired reference (i.e., the particular definition to be used, step G).

One of the options the author has is to simply select an alternate word from thesaurus 20 (step H) and substitute that word so that it is within the proper level of comprehension (step I). When a particular reference is selected, the identified word is tagged with a block identifier which links that reference to the word (step J).

After the composition is completed (step K), the composition is compiled to nest together the words and the references by compiler 30 as shown in FIG. 1. The composition is read and each reference is stored in memory location near the memory location of the tagged word. The block identifier of the tagged word is replaced with the address of the memory location containing the reference (step L).

When a file comprising a modality is completed, it can be operated as a single modality book or can be combined with other modality streams to form a multiple modality book. The integration of the modality streams is performed by compiler 30. This formatting operation is shown on the flowchart of FIG. 2B. The primary modality is first separated into page equivalent blocks (which correspond to the intended user display, step AA). Each page equivalent block contains all the transparent references, quizzes and quiz decision tables which are associated with that page. The corresponding page of each additional modality is then also entered (step BB). The additional modalities are stored in adjacent memory locations (step CC). Thus, when later loaded from permanent memory to RAM, the additional modalities will be loaded into RAM as well. The address of the additional modalities are indexed to the prime modality (step DD) so that later switching can be done upon appropriate user input. The completed file is then mastered onto a cassette tape for later use.

This compiling function is shown graphically in FIG. 3. A page-equivalent block 32 contains a main text sequence plus the associated references. This forms a single modality which is combined with page equivalent blocks 34 from other modalities. This combination of modalities is then combined into a single composite page-equivalent block 36. This entire block 36 is later loaded into RAM at the same time to enable immediate cross-reference.

The later presentation of the formatted file is shown in FIG. 4. The file is stored on a cassette tape 40. Depending upon the amount of room in RAM, a number of page-equivalents are then transferred to RAM for presentation to the user. Preferably, the RAM is continually updated depending upon the position in a presentation so that 10-30 page-equivalents of subsequent text are available along with 3-10 pages of text already viewed. A lesser number of pages of additional modalities are stored to maximize the use of RAM. Thus, a user can advance a great distance in the presentation for material already stored in RAM and can backtrack to some degree while also being able to switch to different modalities. The further a modality is from the current reference, the less likely a switch will be made as quickly, and thus the less need to store as many page equivalents.

Each modality is cross-referenced to the other on the basis of blocks of meaning as discussed later.

FIG. 5 is a block diagram of a learning system (electronic book) for presenting a file compiled according to the present invention. A learning system control module (a) manages data retrieval from the tape, (b) progressively refreshes random access memory, (c) adjusts the relationship of page-equivalent blocks by modality, (d) provides access to the hidden reference materials within the current modality stream, and (e) operates the simulations and programs required. Learning system 42 accesses a memory 44 which contains the various modalities and other programming. A number of function key inputs are provided to learning system 42 so that a user can identify a particular word with a cursor control 46, and then can press a definition function key 48, pronunciation function key 50, elaboration function key 52, or a help switch function key 54. The electronic book learning system is described in more detail later.

The operation of the learning system is shown by the flowchart of FIG. 6. The learning system monitors keyboard inputs to determine if an advanced page command has been input (step A). If so, the next page is presented to the monitor (or voice synthesizer) and the RAM is updated with the next page equivalent block being entered and the last one being discarded (step B). If a particular page number is input, the system replaces the RAM contents with the particular page number specified and the surrounding pages (steps C, D). If a reference is requested for a particular word (step E) the indicated reference is presented to the monitor or voice synthesizer (step F). After the user has absorbed the reference material, he can select to return to the display (step G) and the original display is returned to the monitor or picked up on the voice synthesizer (step H).

Generally, the learning system is designed to provide the user with a versatile learning environment. The system accomplishes this by constantly providing the user with a wide range of learning modality and reference materials. In operation it has the effect of tuning into the user's learning style and then continuously optimizing it's own inner functions to maximize efficiency in working with that style. Whereas traditionally a student moves through a book in a fixed and prescribed way, the learning systems movement through the material is a process as unique as the individual. Whereas traditionally the student is rigidly controlled by the system, here the system and it's presentation are controlled by the user.

When a user is viewing the material in a modality stream, that modality stream is considered "current". The other modalities are called "alternate" modalities 1, 2, 3, etc. When the user is operating on the current modality, he must have maximum rapid access to the information contained in that modality and progressively less rapid access to the other available modalities. Should a modality "switch" be called for (via quiz or test or help) the new modality becomes current and the system's memory management shifts to re-center on the new "current" modality.

This memory utilization scheme provides the user rapid access to any one of the modality streams without incurring delays, while maximizing the amount of information immediately available in the current modality stream.

Within a particular memory zone the learning system will place page equivalent blocks. A page equivalent block is a quanta of information which contains a page of information for display, as well as all reference material which is available for that page. As this is a variable quantity (varying by the volume of reference each page includes and the degree of graphics normally associated with the page) the number of page equivalents a memory zone may contain will vary.

On start up the system will read an orientation/initialization block from the selected composite (multiple modalities with references) file. This block provides the learning system with basic configuration information. Typical information includes the number of modality streams in the file, and the algorithm to be used for multiple modality memory utilization.

The system then proceeds to load the first page equivalent blocks from the composite data stream and presents the starting block to the user. If the first block defines a default modality stream, that modality is selected as 'current' to start with. If the first block does not define a default modality stream, the system will present a questionnaire that will establish the current modality. Once the 'current' modality stream is determined, the first page equivalent for that modality is displayed, while the RAM buffers are loaded up with the right proportions of information for the current modality stream, and it's alternates.

Once the system has primed itself, the reader has a learning environment of approximately 15 to 40 pages on the current modality and decreasing access to the other modalities.

Because the references are already in a RAM buffer, the student will be presented with the requested reference immediately.

As the student moves through the material, the learning system will constantly access new page equivalent blocks, displacing the old, in a process which maintains the overall environment as discussed.

In addition to the uncertainty access method, the author may have placed periodic questions, quizzes or tests in the data stream, to check on the student's progress. The answers to these queries can cause switching to another modality stream, backtracking in the current modality or accessing author specified references.

Learning modalities are commonly described as different ways to present information. As used herein, modalities also refers to different levels of difficulty for a particular way to present information. We define the word modality here as "a different contextual pathway of information which conveys a common meaning at different levels of significance". We also point out that the same student may learn different subjects through different modalities.

In order for the relevant random access process to incorporate learning modalities, the learning modalities must contain a framework which allows for cross reference without sacrificing their primary role as different methods of information conveyance. For example, the student is moving along the current modality and either through his or her request, or as a result of his or her response to a question, the learning system is supposed to switch to an alternate modality to clarify a concept. How is the system to know where the alternate modality to find the appropriate concept? If the author was intimately familiar with each modality he may be able to "tag" the switch points. But this would not allow the student to jump modalities except where the author has provided a linkage. This approach would also throw a prohibitive burden on the author.

The relevant random access process deals with cross modality indexing in a meaningful way. Typically before authoring an educational work, the author breaks the subject down into a hierarchy of key concepts of meaning which he wishes to impart. This framework of meaning later yields to indexing divisions imposed by the publishers. With respect to meaning these indexing standards are quite arbitrary. (Books are indexed by words, names, chapters, assignments, etc.)

In cross modality indexing we use both systems. However, the most important indexing system becomes the meaning index In a meaning index, the content of the work is broken into various meaning modules. By identifying indexing points at the "concept level", (roughly equivalent to a paragraph) we now have a system in which cross modality indexing is simple and straightforward.

The author begins by framing the scope of work into meaning modules. This same framework remains consistent throughout the various modalities which will be written. The content and relative sequential position of these meaning modules varies from modality to modality but the meaning the content is trying to convey is related between the same module in any given modality.

Even though an educator needs to communicate with a variety of learning styles, the function remains to impart meaning. The various students still need to arrive at the essential meaning. Where chapters and pages and paragraphs provide no relevancy between different authoring approaches to these different modalities, meaning modules do.

The "expert authoring system" and "the learning system" both work together to provide this capacity for cross modality indexing. In the expert authoring system, meaning modules are given "block identifiers" that remain identified as such in each modality authored. In the learning system the student user is provided the opportunity to shift from one modality to another in a way which always remains relevant to the meaning he was learning about.

FIG. 8 shows an electronic book according to a preferred embodiment of the present invention. The book, when folded along a seam 112, has dimensions similar to a hardcover book of approximately 7"×10"×1.5". A cassette player 114 houses a cassette 116 which stores the textual information in analog form. The text is supplied through the appropriate circuitry to a liquid crystal display (LCD) screen 118. A next or previous page of text can be displayed through the use of a key on keyboard 122, which also allows a particular page number to be entered and accessed. A counter indicator 124 on display screen 118 provides an indication of the page number.

Books of textual information can be stored on an individual cassette tape 116, which can then be inserted into the cassette player 114 of electronic book 110 for display. A library of books can thus be conveniently stored on cassette tapes. This presents an enormous economical advantage for updating or doing revisions of books, since a tape can simply be erased and replaced with the new information, unlike a hardcopy paper book which would have to be reprinted. In addition, the equivalent of several hardcopy paper books can be stored on a single cassette tape.

The analog coding according to one embodiment of the present invention is shown in FIG. 9. A digital data source 126 provides textual characters encoded in digital form. Digital data source 126 could be any word processing machine. The digital data is supplied to an analog converter 128 which receives a sinusoidal 10 kHz signal from a sine wave generator 130 and modulates it with the digital data to produce the analog signal. The signal is then stored on a magnetic tape 132 for use in the present invention.

For example, the letter "A" may be represented by the digital code 1 0 0 0 0 0. This digital code is used to modulate the sine wave carrier, with each half-cycle being amplitude clipped to indicate a zero, and being unaffected to indicate a digital one. The resulting clipped sine wave signal is then stored on tape 132 to provide a direct analog storage of textual information.

Three cycles therefore provide the capacity to encode any one of up to 63 characters. Two additional cycles can be used for purposes of check summing and identity separation. Thus, with five cycles assigned to carry each character, and utilizing a 10 kHz base cycle, 2,000 characters per second can be encoded. A traditional off-the-shelf 60-minute cassette tape can thus store up to 7,200,000 characters which is the equivalent of approximately six books. Graphic and pictorial data can also be stored. Additional bits may be used for graphic data to give, for example, a total of 10 bits.

This method of analog encoding allows data to be transmitted to the electronic book of the present invention directly as a carrier signal over telephone lines, radio or other methods of transmission. Because each half-cycle of the carrier is a data bit, only zero-crossings need be detected, thus eliminating the need of many existing modems to separately synchronize with a data rate which is different from the carrier frequency rate. A digital data stream from a computer or other data source can be converted to a series of bits which are used to amplitude modulate the 10 kHz carrier frequency every half cycle.

FIG. 10 is a functional block diagram of an electronic book according to the present invention. A tape unit 134 is coupled through a tape interface 136 to a source/destination selector 138. Selector 138 can select one of a number of data inputs or outputs. A phone jack 140 is coupled through a phone interface 142 and a cable TV connector 144 is coupled through a cable TV interface 146 to selector 138. Other I/O ports are indicated by phantom lines 148.

Data to and from selector 138 is provided to an analog electronics module 150. Analog module 150 contains circuitry for both encoding data to convert a stream of digital data into an amplitude modulated sine wave and decode electronics for recovering digital data from such an encoded analog signal. A number of distortion correction modules 152 are coupled to analog module 150 to provide for correction of distortions in the analog signal as needed.

A digital electronics module 154 is coupled to receive data from analog electronics module 150 and is also coupled to a display 156 and a keypad 158. Digital module 154 includes a microprocessor and memory and circuitry for interpreting commands from keypad 158, providing data to display 156 and generally controlling the operation of the electronic book.

The analog module 150 is made up of two basic sections, the encode electronics shown in FIG. 11 and the decode electronics shown in FIG. 12.

The encode electronics or encoder 160 of FIG. 11 consists of four basic blocks: A programmable oscillator 162, a square wave to sine wave converter 164, a data synchronizer 166 and a modulator 168.

Programmable oscillator 162 generates a square wave at the frequency to be encoded. This is the carrier frequency, and is programmable through several speed select, or frequency control, lines 170 which are controlled by a microprocessor. Programmable oscillator 162 also generates other timing signals which are synchronized with the carrier square wave. One of these timing signals, data clock 172, is used to control the transfer of each bit of data from the microprocessor to encode electronics 160.

Square wave to sine wave converter 164 converts the carrier square wave from programmable oscillator 162 into a sine wave at the same frequency. The resulting sine wave is the sine wave which will be amplitude modulated with data.

Data synchronizer 166 ensures that each new bit of data from the microprocessor which reaches modulator 168 is synchronized with the beginning of a half-cycle of the carrier sine wave.

Modulator 168 alters the amplitude of each half-cycle of the carrier sine wave to reflect the state of the associated data bit. A digital '1' is represented by a full amplitude half-cycle of the carrier. A digital '0' is represented by an attenuated half-cycle of the carrier.

The signal out of modulator 168 is an amplitude modulated sine wave which carries one bit of digital information in each half-cycle. Depending on the carrier frequency selected, this signal is suitable for recording on audio magnetic tape, or transmission via phone lines, or transmission via any other medium which will carry amplitude modulated analog signals. Two or more copies of the encode electronics can be used to transmit or record two or more channels of encoded data simultaneously.

The decode electronics or decoder 174 of FIG. 12 consists of five basic blocks: A coarse automatic gain control 176, a distortion compensation circuit 178, a timing synchronizer 180, a data recovery circuit 182 and a data latch 184.

Coarse automatic gain control (AGC) 176 provides a signal of acceptable amplitude compensating for gross variations in the amplitude of the raw incoming signal from one of source interfaces 136, 142, 146 or 148. AGC 176 compensates for conditions such as an inferior signal from a tape playback, or a low volume transmission from a phone line.

Distortion compensation circuit 178 attempts to remove the effects of distortion which is introduced by a particular type of recording or transmission system, and restore the signal to nearly it's original condition. By switching between several types of distortion compensation blocks, circuit 178 handles signals from dissimilar sources.

Timing synchronizer 180 detects and locks on to the frequency of the incoming sine wave carrier and provides timing and logic signals which are synchronized with that carrier. One of these timing signals, decode data clock 186, is used by data latch 184 to capture data bits in the center of each half-cycle of the carrier, where the encoded bit's state is most clearly defined. Decode data clock 186 is also sent to the microprocessor to indicate that a new data bit is waiting.

Data recovery circuit 182 senses the state of the data encoded in each half-cycle of the carrier. This circuit tracks or remembers the amplitude of an encoded '1' and follows changes in that amplitude so that digital '1's and '0's can be differentiated reliably from within a distorted signal.

Finally, data latch 184 latches the data state detected by the data recovery circuits, and holds that data state for the microprocessor until the next data bit is ready. Each new bit is latched in the center of it's half-cycle, and is held until the center of the next half-cycle of the carrier occurs.

Encode electronics 160 of FIG. 11 is shown in more detail in FIG. 13. Programmable oscillator 162 of FIG. 11 consists of a crystal oscillator 188, a programmable rate divider 190, a divide by 25 circuit 192, and a divide by 2 circuit 194.

Crystal oscillator 188 provides a stable high frequency square wave from which all other timing signals for the encode electronics are derived.

Programmable rate divider 190 uses the square wave from crystal oscillator 188 to generate a slower square wave, at a frequency which is programmable by a microprocessor through several frequency select logic inputs 196. The square wave output from programmable rate divider 190 is at a frequency which is 25X the intended data rate, and 50X the intended carrier frequency.

Divide by 25 circuit 192 creates a square wave, with a frequency equal to the intended data rate, from the output of programmable rate divider 190. This signal is used as a data clock 198 to control the transfer of each bit of data from the microprocessor to the encode electronics.

Divide by 2 circuit 194 creates a square wave, with a frequency equal to the intended carrier frequency, from the output of divide by 25 circuit 192.

A square wave to sine wave converter 200 is a low pass filter which allows the fundamental frequency of the carrier square wave to pass, and blocks or attenuates the higher frequency components of that square wave. The resulting output is a sine wave at the frequency of the incoming square wave. This low pass filter is a switched capacitor type which utilizes a clock to control the frequencies it will pass and the frequencies it will block. The clock which is used to control the characteristics of this filter is the square wave from the programmable rate divider. Thus, when the microprocessor selects a new frequency through the rate divider, this filter's characteristics are changed to match the intended carrier frequency.

Data synchronizer 166 of FIG. 11 is simply a latch 202 which transfers each data bit from the microprocessor to the modulator at the beginning of a new half-cycle of the carrier. This is accomplished by clocking synchronizer latch 202 with the square wave output from divide by 25 circuit 192.

Modulator 168 of FIG. 11 is simply an analog switch or multiplexer 204 which is controlled by the data from data synchronizing latch 202. The multiplexer 204 selects either a full-size signal from square wave to sine wave converter 200, or an attenuated version of that same signal from an attenuator 206, depending on the state of the data from synchronizing latch 202. The full sized signal is selected when the synchronized data is a '1', the attenuated signal is selected when the synchronized data is a '0'. The output of multiplexer 204 goes to a final amplifier (not shown). The output of this amplifier is suitable for transmission or recording.

The decode electronics of FIG. 12 are shown in more detail in FIG. 14.

A coarse automatic gain control circuit 208 controls the amplitude of the incoming signal to ensure that it is within limits which the rest of the circuitry can deal with.

A distortion compensation section 210 consists of active filters; a phase equalizer 212 and a low pass filter 214 which attempt to compensate for phase distortion in the signal which would have been introduced by the transmission or recording medium, as well as any extraneous signals which may have been introduced. These are switched capacitor type filters, similar to the type described previously regarding square wave to sine wave converter 200. As such, these filters are tuned for the frequency of the expected carrier when programmable rate divider 190 of the encode section is set. The signal out of section 210 looks more like the original encoded sine wave than the signal in.

A timing synchronizer 216 consists of a band pass filter 218, a limiter 220, and a phase-locked-loop 222 which includes a programmable rate divider 224. Band pass filter 218 and limiter 220 attempt to reconstruct the original carrier square wave from the incoming signal. Band pass filter 218 is a tunable filter like the one discussed earlier. Filter 218 is tuned to the expected carrier frequency when the encode circuit's programmable rate divider 190 is set.

Phase-locked-loop 222 uses this reconstructed carrier to synchronize it's oscillator with the carrier being received, tracking minor variations in the carrier frequency. The output of phase-locked-loop 222 is a square wave of higher frequency than the carrier frequency, which is locked to the carrier.

The output of the oscillator of phase-locked-loop 222 is sent to programmable rate divider 224. Rate divider 224 is set by the microprocessor for the expected carrier frequency, and controls the frequency which phase-locked-loop 222 will lock on. The output of rate divider 224 goes to phase-locked-loop 222 to control the lock frequency, and to data latch 226 to control the capture of each data bit as it is extracted from the carrier.

A data recovery section 228 consists of a zero reference clamp 230, an absolute value circuit 232, a '1' level tracking circuit 234, and a comparator 236.

Due to AC coupling of the incoming signal, and the asymmetry associated with encoding one bit per half-cycle of the carrier, DC offsets are introduced into the signal. These offsets vary as the content of the data in the carrier varies. This offset can move the center of the signal up or down from 0 volts enough to cause errors in recognition of encoded data. Zero reference clamp 230 serves to rectify this problem. Reference clamp 230 works in concert with '1' level tracking circuit 234 to re-reference the encoded signal to ground (OV) whenever a '0' level half cycle is detected. This 're-referencing' on the recognition of '0' level half-cycles helps to minimize errors caused by data induced DC offsets. The output of the reference clamp 230 goes to absolute value circuit 232.

Absolute value circuit 232 makes all negative going half-cycles positive. This reduces the amount of circuitry required to recognize '1's from '0's since all half-cycles become positive going. The output of absolute value circuit 232 goes to both '1' tracking circuit 234 and data comparator 236.

'1' tracking circuit 234 follows the amplitude of the incoming signal during each half cycle which is encoded as a '1', and generates a signal which is approximately one-half the amplitude of a '1' level. The output of the '1' tracking circuit is a slowly varying DC signal which tracks the average amplitude of '1' level half cycles, and is used by data level comparator 236 to differentiate '1's from '0's.

Data level comparator 236 compares the reference level provided by '1' tracking circuit 234, to the signal from absolute value circuit 232. The output of data comparator 236 is a digital signal which always indicates the relationship of the two signals. The output of comparator 236 reliably indicates the state of the encoded data bit in any half-cycle of the carrier, when it's output is sampled at the center of the half-cycle. The output of comparator 236 goes to data latch 226 for just such sampling control.

Data latch 226 receives data levels from data comparator 236, and is clocked by the phase-locked square wave from programmable rate divider 224. This clock 238 from rate divider 224 causes data latch 226 to latch and hold the value of each data bit at the center of each half cycle of the incoming carrier, thus ensuring that recovered state of the data is valid at the time it is latched. The data in latch 226 is held constant, so that the microprocessor can retrieve it, until the center of the next half-cycle occurs. Clock 238 also signals the microprocessor when each new data bit is available.

FIG. 15 shows in block diagram form the digital electronics module 154 of FIG. 10. A microprocessor 242 is coupled to a 19 bit address bus 244 and an 8 bit data bus 246. These busses provide for the transmission of data and control signals among the various elements of the electronic book. A keypad 248 provides input signals through a keypad control circuit 250 to microprocessor 242. A liquid crystal display 252 is controlled by a controller 254 using data from a display memory 256. A ROM memory 258 and a RAM memory 260 are also provided.

The transmission and receiving of signals from outside the digital electronics module is controlled by a universal asynchronous receiver/transmitter (UART) 262, a universal synchronous/asynchronous receiver/transmitter (USART) 264, an analog control circuit 266, a tape control status circuit 268, and the input control 270. These circuits provide data and control signals to and from the various elements of the electronic book along data bus 246 to microprocessor 242 under the control of designated lines of address bus 244.

Microprocessor 242 initializes liquid crystal display controller 254 by writing specific set-up values into the registers of controller 254. Once initialized, controller 254 continuously reads the contents of display memory 256, setting each dot in display 252 'on' if the associated bit in memory is a '1', and 'off' if the bit is a '0'. Display 252 contains 640×400 or 256,000 dots which are controlled by the first 32,000 bytes of display memory 256 (8 bits each).

To modify a dot on the display, microprocessor 246 changes the state of the correct bit in the correct byte of display memory 256 for the desired dot. Microprocessor 242 is able to read from, or write to display memory 256 at any time.

To retrieve data from the tape, the 'PLAY' control on tape unit 134 of FIG. 10 must be pressed in, and microprocessor 242 must release the 'PAUSE' control bit.

The signal from the tape is conditioned and decoded by the analog electronics 150 (FIG. 10). After this conditioning and decoding, the digital electronics 154 is presented with a serial stream of data from the tape, and a clock which identifies the locations of the bits within the stream. These signals go to the serial data interface (USART) 264 which is connected to the analog electronics 150. Interface 264 converts the serial data stream into data bytes, interrupting microprocessor 242 whenever a new byte has been assembled.

In order to record data on the tape, the 'RECORD' and 'PLAY' buttons on the tape unit 134 must be pressed in, and microprocessor 242 must release the 'PAUSE' control. Once the tape is moving with recording enabled, microprocessor 242 simply writes each data byte to be recorded to USART 264 which is connected to analog electronics 150. USART 264 converts each byte into a serial data stream. That serial data stream is sent to analog electronics 150 for encoding in synchronization with the record clock which is supplied by the analog electronics. Interface 264 interrupts microprocessor 242 whenever it is ready to send another byte. Data to be recorded may come from memory 260, or from the second serial interface (UART) 262.

Keyboard control 250 is made up of a set of 6 column drivers which microprocessor 242 can turn 'on' or 'off', and eight bits of row status which the microprocessor can read. These rows and columns make up an array of 48 possible key depressions which microprocessor 242 can sense.

To read keyboard 248, microprocessor 242 turns 'on' one of the column drivers, and reads the row status bits. Each row status bit which shows a '0' indicates a key which is pressed. This operation is repeated for all columns.

The row status bits are also gated together so that an interrupt to microprocessor 242 is generated when any key is depressed.

Cassette control/status interface 268 allows microprocessor 242 to enable or disable cassette transport PAUSE, and to monitor when the 'PLAY' and 'RECORD' buttons have been pressed.

Analog electronics control interface 266 allows microprocessor 242 to select the basic data rate for encoded data which is to be recorded or otherwise transmitted, select which of the tape's stereo channels (left or right) data is to be read from or recorded on, and allows microprocessor 242 to use the right channel of the tape for audio recording and playback, or for recording and playback of encoded data.

RAM 260 (64K bytes) and ROM 258 (64K bytes) are necessary to support the basic operation of microprocessor 242. The RAM space provided is large because it is used to hold large amounts of data from the tape.

The basic function of the software in ROM 258 is to manage the flow of data to and from the major components of the electronic book. These include the communication interfaces, the tape recording and playback interfaces, the memory buffers, and the display. This control of data flow is managed based upon entries made by the user on keypad 248.

The data which the book receives from tape or from a communication interface is arranged in blocks. Each block of data includes a header which indicates what type of data is contained in the block, the block's position is the data stream or on tape, and any other data related to information management, which may be needed for the block type. This information is used by the software to manage the flow of data from each source of data, and manage the transfer of that data to the display in logical order.

Some of the data block types contain only management information, and no 'raw' data. These special purpose blocks contain tables of contents, page position information, and the like.

An encoded tape or data stream consists of groups of data blocks which are retrieved and operated on by the book's software. There is a structure in the way that data blocks are ordered on a tape, or in a data stream which facilitates the management of that data by the book's software.

The first block may be a program block, or a leading table of contents block. A program block contains an application program to be loaded and run by the book. A table of contents block contains a list of the titles available on the tape or data stream, and their starting positions and starting block numbers.

The data for each selection listed in the leading table of contents is contained in a sequential group of data blocks. Each of these groups may include a table of contents of it's own. If a selection does include a table of contents (TOC), that TOC will be in the first block defined for the selection, and it will be accompanied by a page specification block. The selection's TOC contains chapter or section titles and the associated starting page numbers. The page specification block contains a table listing the starting and ending page numbers of the text contained in each of the rest of the blocks in the group.

The remainder of the blocks in a group consists of text, or graphics blocks. The text blocks can contain many pages of text for display. The end of each page is delineated with form feed characters.

Graphics blocks contain data which represents a graphic image to be displayed with one or more pages of text. The range of pages for display is defined within the graphics block header.

A special audio block type indicates that the tape or data source is delivering dual track information which should not be interrupted. Interrupting this type of data stream would interrupt the speech or music on one channel, which accompanies the data for display which is on another channel. In this mode of operation, the software retrieves data from the associated data channel continuously and displays it as it becomes available, allowing the other channel to run uninterrupted.

The management of several separate buffer memory areas is an important aspect of the software's operation, and underlies all other operations.

There are logically separate buffer memory in physical RAM 260 areas which the software manages. The program buffer is an area where program blocks from the tape or data stream are stored. This allows the book to retrieve application software from the tape or data stream in order to customize the book's operation for a given application. The table of contents buffer area contains all table of contents information from the leading table of contents block, and also the selection's table of contents and page specification blocks if the selection has those blocks. The software maintains this information in a separate buffer area for immediate access, whenever the user requests the table of contents, or requests a jump to another section or page. The graph buffer is an area which holds data for up to two graphic images, one associated with each of the text buffer areas. Finally, there are two source buffers. These are used alternatively to retrieve data from the selected data source. If the data retrieved is a table of contents, or page specification block, or a graphic block, the associated data is moved immediately to the appropriate special purpose buffer area. There is also a selected text buffer area. This area is used to store segments of text which the user selects for special operations like storage on a tape containing excerpts of special interest.

Management information, such as the block numbers and positions of the blocks which are presently in the source buffers, is maintained by the software in another area of memory.

When the electronic book is turned on, the software initializes all of the electronics as required for normal operation, and displays a prompt to encourage the user to use the keypad to indicate what he would like the book to do. From this point on, all operations are initiated through the keypad. Generally, the operator will select a data source to begin using the book.

As mentioned above, the operation of the book is based on commands issued by the operator, through the keypad. The keypad commands are described below. It is important to note that all of the keys on the keypad can be used by loadable application programs. This feature allows complete customization of the operation of the keypad commands.

New Source

This command allows the operator to select a new or initial source of data. This source can be the telephone port, a cable channel and subchannel, the tape, or any other data interface included in the book. The software lists the available sources in menu form. The operator then uses the NEXT and PREVIOUS keys to select the desired source, and presses SELECT to finalize the choice.

Next and Previous

These commands are used to step through the selections on any menu or table of contents the book presents to the user. They are also used to step through any document the user views, page by page.

Select

When a menu or table of contents is displayed, this command indicates that the user has finalized his choice.

Table of Contents

The table of contents command allows the operator to call up each level of table of contents to see other selections, and to jump to another section of the presently selected document, or to another document entirely.

Number Keys

These keys allow the operator to select specific pages for viewing, by number.

Record or Save

This command initiates the transfer of data from the book to tape, or to any of the communication ports.

Retrieving Data

When a new data source is selected, or a new tape loaded in the cassette, the software reads the first logical block from the data source, or the first block from tape.

If that block is not a program block, it contains the table of contents as described above. The entries in that table of contents block are then listed on the display. The user selects one of the entries in the list using the keypad. When a selection is made, the software finds and retrieves the first data block specified for the selection. If that block is another table of contents, the following two blocks are also retrieved. These are the page specification block, and finally the first block of displayable data.

If the first block is a program block, the program is loaded into the program buffer area, and control is transferred to it. The operation of the book is then under complete control of the application program until that program returns control to the book's resident software.

Throughout the process of retrieving data, the software alternates the use of two data buffers so that the last two blocks read are always available in memory. This allows the user to move backward or forward several pages through the text at any time without forcing the software to retrieve another data block. This is particularly important when the data source is a tape, so that lengthy rewind operations are generally avoided.

Once a selection is chosen and the initial block or blocks read in, subsequent blocks are read in as the user steps through the available text. A new block is read in several pages before it is actually needed. When a graph block is encountered, it is read in, transferred to the graph buffer, and the following block is read.

When a graph has been read in, and a page is requested which falls within the range of pages which are specified for display of the graph, the graph image is copied from the graph buffer to the display, and the text for the page is placed in the remaining space on the display.

If the first block of the selection is an audio block, the remainder of the selection is transferred without the normal page management operations. The data stream is read continuously, and text and images are transferred to the display as soon as they are available. This allows the associated 'audio' track to proceed uninterrupted. This operation is primarily a tape related function where stopping of the tape after each data block is read is undesirable.

The continuing retrieval of text and graphic images is controlled by the user through the use of the NEXT PAGE and PREVIOUS PAGE keys. At any time, the user can call up the table of contents for the current selection and select a different section or page to jump to. The user can also call up the table of contents for the tape or data stream to change selections at that level. Finally, the user can choose another data stream or enter a new tape to change the source of data entirely.

Sending or Recording Data

The book provides three mechanisms for sending or recording encoded data. Data from a host computer can be encoded and recorded on a tape, data which has been selected during reading can be recorded on a separate tape for later use, and application programs may transmit any encoded data out any communication interface.

To record data from a host computer, or record data selected from the text being read, the user presses the RECORD key on the keypad. When this command is recognized, the software asks the user if host data or selected data is to be recorded. Using the NEXT and PREVIOUS keys, the user indicates his choice.

If recording of host data was selected, the software prompts the user through the loading and rewinding of a new tape, sets the required control signals to the analog electronics subsystem to set the carrier frequency and direct the output signal from the encode electronics to the tape, then waits for data from the host computer. All data from the host is read in via the host interface, and transferred directly to the encode electronics for encoding and transmission to the recorder.

If recording of selected data was chosen, the action is essentially the same, but all data in the 'select buffer' is sent to the encode electronics rather than data from the host.

The transmission of encoded data out the communication ports is managed by specially loaded application programs. Support routines are provided in the book's resident software to manage low level operations like setting data rates, selecting the communication port, and sending each character.

FIG. 16 is a block diagram of an electronic book according to the present invention adapted for use by the visually impaired or users in applications where viewing a screen is undesirable. A headphone input jack 300 provides right and left track signals to signal preparation circuitry 302 and 304, respectively, and then to decoders 306 and 308, respectively. The decoded data is provided to a RAM 310 and a speech synthesizer 312 under the control of a central processing unit (CPU) 314. CPU 314 has its associated static RAM 316 and ROM 318. Control keys 320 direct the operation of CPU 314.

The output of speech synthesizer 312 is provided through audio oscillators 322 and 324 and audio amplifiers 326 and 328 to a headphone jack output 330.

An analog tape (not shown) provides two tracks of analog signals through headphone input jack 300. One track contains the raw data and the other track is formatted to contain control and indexing information. The operation of the electronic book of FIG. 16 is similar to that of FIG. 10 except that information is produced verbally rather than visually. In addition, control and indexing information is provided verbally. A user responds to the verbal prompts with the control keys 320 to select a portion of an index or of the data which the user desires to listen to. The digital data stored on the control track or channel contains a series of heirarchal menus and periodically placed content position location flags. The channel containing the raw data preferably is encoded in the form of two bits per cycle at a rate of approximately 5 kHz. This data is formatted in a manner correlated with the menus and position flags on the control channel so that the relative position along the tape can be mathematically determined and easily accessed.

Because the control and indexing information only uses a portion of the control track of the tape, there will be blank spaces on the control track which can be used for user responses. Such user responses may be recorded where the raw data is a study program with periodic tests which require responses to test questions. Alternately, the blank spaces can be used for annotations.

The headphone jack 330 is plugged into a standard stereo amplifier (not shown) or a special headset or speaker. Similarly, the recording tape coupled to headphone input jack 300 is from a standard tape player or a tape player integrated with the electronic book in the manner shown in FIG. 8.

A final embodiment combines the speech synthesis of FIG. 16 with the visual display of FIG. 10. The user selects the desired output mode and the central processing unit adjusts the control data accordingly. Alternately, the menu and control prompts could be presented in audio with the raw data being presented visually, or any other combination. Thus, both audio and visual data may be presented simultaneously.

As will be understood by those familiar with the art, the present invention may be embodied in other specific forms without departing from the spirit or essential characteristics thereof. For example, additional modules other than the particular ones listed (dictionary, thesaurus, etc.) could be utilized. Alternately, a presentation can be stored on other than a cassette tape or floppy disk. Accordingly, the disclosure of the preferred embodiments of the invention is intended to be illustrative, but not limiting, of the scope of the invention as set forth in the following claims.

APPENDIX 1 - LEARNING MODALITIES

A learning modality refers to a learning style. Educational psychologists have offered up the term and it's meaning in an effort to deal with what educators have long known but have been unable to express cogently. "Students learn in different ways and at different rates".

In a synthesis of extensive research on "style" learning, "right-left" brain learning, and learning modalities, the Santa Clara County Office of Education released a report on the "new dimensions of learning". The following extracts serve to illustrate the basic differences in terms of four basic learning styles and three basic learning modalities:

(1) Practical Learners (concrete Sequential)

Students who learn best with hands-on, practical experiences presented in a step-by-step orderly manner. They need to know the practical use of the information.

(2) Analytic Learners (Abstract Sequential)

Students who like to explore ideas by reading and research. They prefer information presented sequentially and orderly and can learn through well organized lectures.

(3) Interactive Learners (Abstract Random/Simultaneous)

Students who learn through discussions, interactions, and exploring ideas. They need to apply learning to their own life experience. They work well in groups and respond to the emotional climate of the learning environment.

(4) Experimental Learners (Concrete Random/Simultaneous)

Students who learn by exploring. They are spontaneous, inquisitive and action oriented. Often impulsive, creative and risk-takers. These students have a random approach to problem solving and tend to jump right in without following directions.

The three modality preferences include:

(1) Visual Learners

Students who prefer pictures, visual models and written direction to learn, are often distracted by visual disorder and like things neat and orderly.

(2) Auditory Learners

Students who rely on listening, verbal directions and self-talk to learn, are often distracted by background noises and other auditory distractions.

(3) Kinesthetic/Tactile Learners

Students who rely on touch and body movement to learn, will feel objects, tract words and learn by doing.

What is claimed is:

1. A method for compiling information for presentation on a monitor or through a voice synthesizer, comprising the steps of:
providing a first set of information requiring a first level of comprehension;
dividing said first set of information into first discrete subsets;
providing a second set of information, corresponding to said first set of information, having a second level of comprehension;
dividing said second set of information into second discrete subsets corresponding to said first discrete subsets;
indexing each of said first subsets to a corresponding one of said second subsets to accommodate switching between said subsets by a user of said monitor or voice synthesizer;
encoding said information on a magnetic tape as an analog sine wave with each half-cycle amplitude modulated to represent a data bit, said sets of information being on a first track of said tape and control signals for said indexing being on a second track of said tape;
converting said analog signal on a portion of said tape into an electrical signal;
converting said electrical signal into a series of digital bits;
storing said digital bits in a buffer;
converting said digital bits into a format representing characters; and
displaying said characters on said monitor.

2. The method of claim 1 further comprising the step of grouping each of said second subsets in a memory location proximate a memory location for a corresponding first subset.

3. The method of claim 2 further comprising the step of storing said information in a non-volatile memory.

4. A method for presenting on a monitor or through a voice synthesizer information compiled according to the method of claim 1, comprising the steps of:
progressively presenting successive subsets of said first set of information pursuant to user inputs;
monitoring said user inputs for a switch instruction; and
presenting a subset of said second set of information corresponding to a currently presented subset of said first set of information responsive to a user switch instruction.

5. The method of claim 4 further comprising the steps of:
storing said first and second sets of information in a non-volatile memory; and
transferring a first subset to be next presented and a corresponding second subset to a high speed memory responsive to a user command.

6. A method for compiling information for presentation on a monitor or through a voice synthesizer comprising the steps of:
providing a first set of information;
selecting elements of said first set of information for further explanation;
providing a set of explanatory information for any selected element of information in said first set of information;
indexing each set of explanatory information to the corresponding element of information in said first set of information to accommodate switching between said element of information and said explanatory information by a user, whereby only said first set of information is presented to said user unless there is a switch between said element of information and said explanatory information by said user;
encoding said information on a magnetic tape as an analog sine wave with each half-cycle amplitude modulated to represent a data bit, said sets of information being on a first track of said tape and control signals for said indexing being on a second track of said tape;
converting said analog signal on a portion of said tape into an electrical signal;
converting said electrical signal into a series of digital bits;
storing said digital bits in a buffer;
converting said digital bits into a format representing characters; and
displaying said characters on said monitor.

7. The method of claim 6 further comprising the steps of storing said first set of information in a memory and storing each said set of explanatory information in a memory location proximate a memory location of said corresponding element of information.

8. The method of claim 7 wherein said explanatory information comprises at least one of a dictionary definition, an encyclopedia extraction, speech synthesizer data and a graphical image.

9. The method of claim 6 wherein said selecting step comprises the steps of:
providing a list of words at a first level of comprehension;
comparing said first set of information to said list of words; and
identifying to an author any word in said first set of information not found on said list.

10. The method of claim 9 further comprising the steps of:
providing at least two types of explanatory information for each said word not on said list;
listing said types of explanatory information on a monitor for an author for each said word not on said list;
monitoring an input for an author selection; and
indexing one of said types of explanatory information to said word in response to said author selection.

11. A method for presenting a monitor or through a voice synthesizer information compiled according to the method of claim 6, comprising the steps of:
progressively presenting successive elements of said first set of information responsive to user inputs;
monitoring said user inputs for an instruction requesting explanatory information for an identified element; and presenting a set of explanatory information indexed to said identified element responsive to said instruction.

12. The method of claim 11 further comprising the steps of:

storing said first set of information and said explanatory information in a non-volatile memory; and transferring a portion of said first set of information to be next presented, along with explanatory information indexed to said portion, to a high speed memory responsive to a user command.

* * * * *